(12) United States Patent
Mizuguchi

(10) Patent No.: US 8,667,949 B2
(45) Date of Patent: Mar. 11, 2014

(54) ENGINE DRIVEN POWER GENERATOR APPARATUS

(71) Applicant: Honda Motor Co. Ltd., Tokyo (JP)

(72) Inventor: Hiroshi Mizuguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/713,312

(22) Filed: Dec. 13, 2012

(65) Prior Publication Data

US 2013/0213337 A1 Aug. 22, 2013

(30) Foreign Application Priority Data

Feb. 17, 2012 (JP) ................................. 2012-033231

(51) Int. Cl.
*F02M 35/10* (2006.01)
*F02C 7/045* (2006.01)

(52) U.S. Cl.
CPC ... *F02M 35/10091* (2013.01); *F02M 35/10104* (2013.01); *F02C 7/045* (2013.01)
USPC .................. 123/198 E; 123/184.21; 290/1 A; 290/1 B; 181/222; 181/252; 181/256

(58) Field of Classification Search
CPC ................................................ F02M 35/10091
USPC ................... 290/1 A, 1 B; 181/222, 252, 256
See application file for complete search history.

(56) References Cited

U.S. PATENT DOCUMENTS

| | | | | |
|---|---|---|---|---|
| 2,497,947 A | * | 2/1950 | Lewis | 454/337 |
| 4,231,447 A | * | 11/1980 | Chapman | 181/213 |
| 4,907,546 A | * | 3/1990 | Ishii et al. | 123/41.56 |
| 5,899,174 A | * | 5/1999 | Anderson et al. | 123/2 |
| 6,568,355 B2 | * | 5/2003 | Suzuki | 123/2 |
| 6,670,580 B2 | * | 12/2003 | Brofft et al. | 219/134 |
| 6,975,042 B2 | * | 12/2005 | Yamada et al. | 290/1 R |
| 7,314,397 B2 | * | 1/2008 | Sodemann et al. | 440/89 R |
| 7,557,458 B2 | * | 7/2009 | Yamamoto et al. | 290/55 |
| 2003/0042806 A1 | * | 3/2003 | Inaba et al. | 310/58 |
| 2009/0230697 A1 | * | 9/2009 | Hatsugai et al. | 290/1 B |
| 2009/0314228 A1 | * | 12/2009 | Fukuda et al. | 123/41.6 |
| 2010/0060015 A1 | * | 3/2010 | Buker | 290/1 R |
| 2011/0303482 A1 | * | 12/2011 | Niwa et al. | 181/228 |
| 2012/0205070 A1 | * | 8/2012 | Kamiya et al. | 165/96 |

FOREIGN PATENT DOCUMENTS

| | | |
|---|---|---|
| JP | H07-30565 | 6/1995 |
| JP | 2010-004714 | 1/2010 |

* cited by examiner

*Primary Examiner* — Noah Kamen
*Assistant Examiner* — Grant Moubry
(74) *Attorney, Agent, or Firm* — Rankin, Hill & Clark LLP

(57) ABSTRACT

An engine-driven power generator apparatus, which includes, within a case, an engine and a power generator drivable with the engine, and in which an operation panel is provided on a front cover and an air intake louver for introducing air into the case is provided within the case, includes: a waterproof cover covering the operation panel and the air intake louver; an air guide passage of a labyrinth shape provided within the waterproof cover and communicating the outside of the waterproof cover with the air intake louver; and a brush-shaped water separation unit provided in the air guide passage and having a plurality of pins projecting in a direction intersecting flows of air in the air guide passage.

5 Claims, 11 Drawing Sheets

ENGINE DRIVEN POWER GENERATOR APPARATUS

FIELD OF THE INVENTION

The present invention relates to engine-driven power generator apparatus which include, within a case, an engine and a power generator drivable with the engine, and in which an operation panel and an air intake port are provided on a wall of the case and air can be introduced into the case through the air intake port.

BACKGROUND OF THE INVENTION

Various types of engine-driven power generator apparatus provided with a waterproof structure have heretofore been known, among which is one disclosed in Japanese Utility Model Application Laid-open Publication No. HEI-7-30565 (hereinafter referred to as "patent literature 1"). In the engine-driven power generator apparatus disclosed in patent literature 1, an engine and a power generator are provided within a case, an air intake port is provided on a side wall portion of the case, an air intake duct is provided in the air intake port and extending downward, an opening section is formed in a lower end portion of the air intake duct, and a metal net is provided in an upper region of the opening section for protecting the interior of the air intake duct. The air intake port is covered with the air intake duct provided in the air intake port and extending downward, so that water, such as rain water, can be prevented from entering the intake port through the upper and side surfaces of the intake port. Because the metal net is provided in an upper region of the opening section, it is possible to prevent water such as rain water, having scattered upwardly from below the opening section, from easily reaching the metal net.

Another type of engine-driven power generator apparatus provided with a waterproof structure is disclosed in Japanese Patent Application Laid-open Publication No. 2010-4714 (hereinafter referred to as "patent literature 2"), according to which an air guide passage for introduces air into the case is formed in a so-called "labyrinth" shape by being provided with baffle plates. With such a labyrinth-shaped air guide passage, it is possible to separate water (water droplets and mist) from air flowing along the air guide passage.

However, with the waterproof structure disclosed in patent literature 1, where merely the metal net is provided at a considerable height above the opening section, rainwater having scattered upwardly from below the opening section can reach the metal net. The rainwater having reached the metal net like this may undesirably enter the interior of the case through the opening section together with air sucked in via the opening section.

Further, with the waterproof structure disclosed in patent literature 2, where merely the air guide passage is formed in a labyrinth shape, there has been a demand for a further improvement to reliably separate water (water droplets and mist) from air flowing along the air guide passage.

Generally, in the engine-driven power generator apparatus, the operation panel that includes, among other things, AC and DC terminals for outputting electric power, is provided on the outside of the case. Thus, there is a need to cover the operation panel with a cover member, in order to enhance the waterproof property or capability of the engine-driven power generator apparatus. However, if the operation panel is covered with such a cover member, the cover member would hinder a human operator from operating switches etc. of the operation panel and pulling out a conductive cable connected to the AC and DC terminals. But, if arrangements are made for allowing a human operator to operate the switches etc. of the operation panel with an improved operability and to pull out or take out the cable, connected to the AC and DC terminals, with an increased ease, then it would become difficult to secure a sufficient waterproof property of the operation panel with the cover member.

SUMMARY OF THE INVENTION

In view of the foregoing prior art problems, it is an object of the present invention to provide an improved engine-driven power generator apparatus which can secure a sufficient waterproof property.

In order to accomplish the above-mentioned object, the present invention provides an improved engine-driven power generator apparatus which includes, within a case, an engine and a power generator drivable with the engine, and in which an operation panel is provided on a wall portion of the case and an air intake port for introducing air into the case is provided within the case, which comprises: a waterproof cover covering the operation panel and the air intake port; an air guide passage of a labyrinth shape provided within the waterproof cover and communicating an outside of the waterproof cover with the air intake port; and a brush-shaped water separation unit provided in the air guide passage and having a plurality of pins projecting in a direction intersecting flows of air in the air guide passage.

In the engine-driven power generator apparatus of the present invention, the labyrinth-shaped air guide passage is provided within the waterproof cover, the water separation unit of a brush (flower-arranging-pin-holder) shape is provided in the air guide passage, and the plurality of pins of the water separation unit project in a direction intersecting flows of air in the air guide passage. Thus, as air flowing along the air guide passage passes among the pins of the water separation unit, the air hits the pins, so that water (water droplets and mist) contained in the air can stay on the pins. In this way, the present invention can separate the water from the air and prevent the water, such as rain water, from entering the interior of the case, thereby securing an enhanced waterproof property Preferably, in the engine-driven power generator apparatus of the present invention, the air guide passage includes an air introducing section provided in a lower end portion of the waterproof cover and opening downwardly, and a guide wall provided vertically above the air introducing section for upwardly guiding air introduced via the air introducing section. With the introducing opening downwardly, the present invention can prevent water, such as rain water, from easily entering the air guide passage through the air introducing section. Further, preferably, the water separation unit is not only provided to cover a substantially entire flow path cross section of the air introducing section but also provided on the inner surface of the guide wall. Thus, the water, such as rain water, separated by the water separation unit can be directed to the air introducing section and then discharged out of the waterproof cover. By thus preventing the water, such as rain water, from easily entering the air guide passage through the air introducing section and discharging the water, such as rain water, separated by the water separation unit out of the waterproof cover, the present invention can reliably prevent the water, such as rain water, from entering the case, thereby securing a reliable waterproof capability.

Preferably, in the engine-driven power generator apparatus of the present invention, the waterproof cover has an opening section formed in confronting relation to the operation panel (control panel), and the waterproof cover includes an opening/closing cover for opening and closing the opening section. By closing the opening/closing cover, the present invention can secure a waterproof property of the operation panel. Further, by opening the opening/closing cover, the present invention allows a human operator to readily operate operation switches etc. of the operation panel and thereby can enhance operability of the operation switches etc.

Preferably, in the engine-driven power generator apparatus of the present invention, the opening section of the waterproof cover has a cable-accommodating recessed portion provided therein to accommodate a conductive cable for outputting electric power generated by the power generator. By the cable being accommodated in the cable accommodating recessed portion, the opening/closing cover can be closed without interfering with the cable. Thus, while electric power generated by the power generator is output, the opening/closing cover can maintain the opening section in a waterproof state by means of the opening/closing cover with the cable partly taken out from the opening section through the cable accommodating recessed portion.

Further, preferably, in the engine-driven power generator apparatus of the present invention, the waterproof cover is detachably mounted to the case by means of a fastener member. Thus, the waterproof cover is applicable to existing engine-driven power generator apparatus. In this way, it is possible to expand the application of the waterproof cover. Further, it is possible to readily select specifications of an engine-driven power generator apparatus equipped with a waterproof function and an engine-driven power generator apparatus not equipped with a waterproof function, depending on their intended applications.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Figure 1:
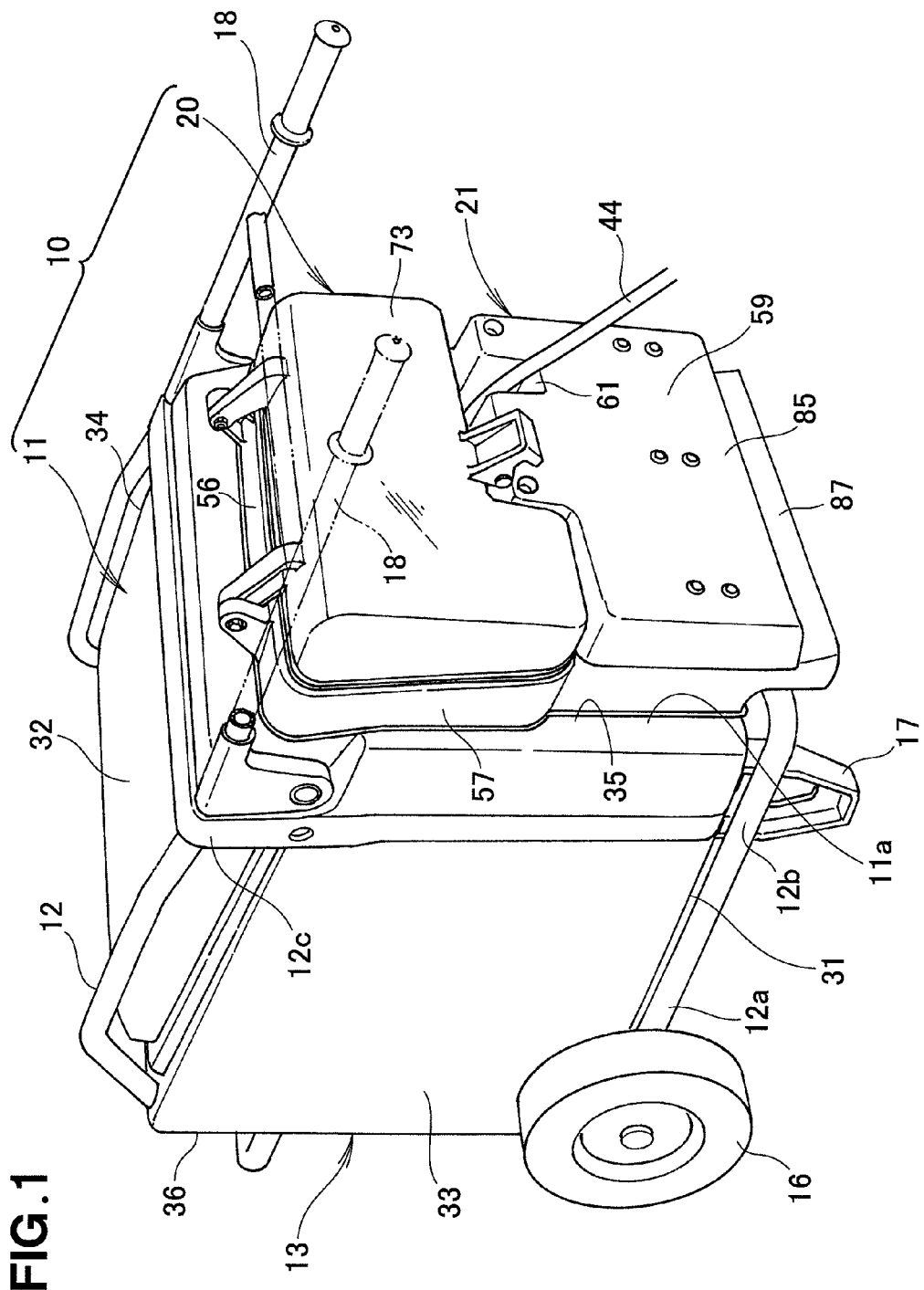
FIG. 1 is a perspective view showing an engine-driven power generator apparatus according to a preferred embodiment of the present invention.

As shown in FIG. 1, a preferred embodiment of an engine-driven power generator apparatus 10 of the present invention includes a power generator apparatus body 11, and a waterproof unit 20 provided on a front section 11a of the power generator apparatus body 11.

Figure 2:
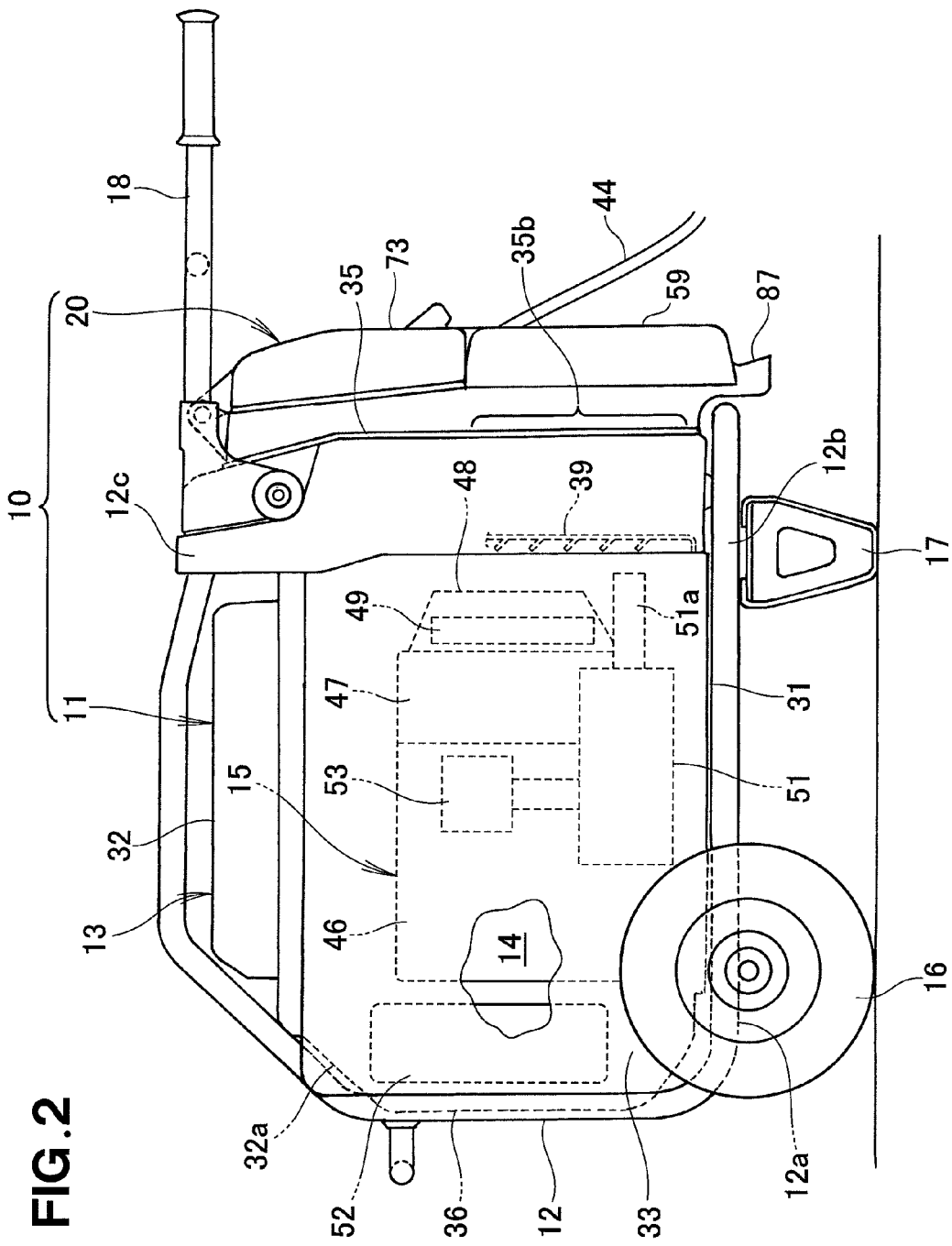
FIG. 2 is a side view showing the engine-driven power generator apparatus of FIG. 1.

As shown in FIG. 2, the power generator apparatus body 11 includes: a framework member 12 forming a framework of the power generator apparatus body 11; a case 13 mounted to the framework member 12; a power generator unit 15 provided within the interior 14 of the case 13; a pair of wheels 16 (only one of which is shown in the figure) mounted on a rear lower portion 12a of the framework member 12; a pair of leg sections 17 (only one of which is shown in the figure) mounted on a front lower portion 12b of the framework member 12; and a pair of handles 18 (see also FIG. 1) mounted on a front upper portion 12c of the framework member 12.

The case 13 includes: a lower cover 31 covering the power generator unit 15 from below; an upper cover 32 covering the power generator unit 15 from above; a left side cover 33 covering the power generator unit 15 from the left side; a right side cover 34 (see FIG. 1) covering the power generator unit 15 from the right side; a front cover 35 covering the power generator unit 15 from the front; and a rear cover 36 covering the power generator unit 15 from the rear.

Figure 3:
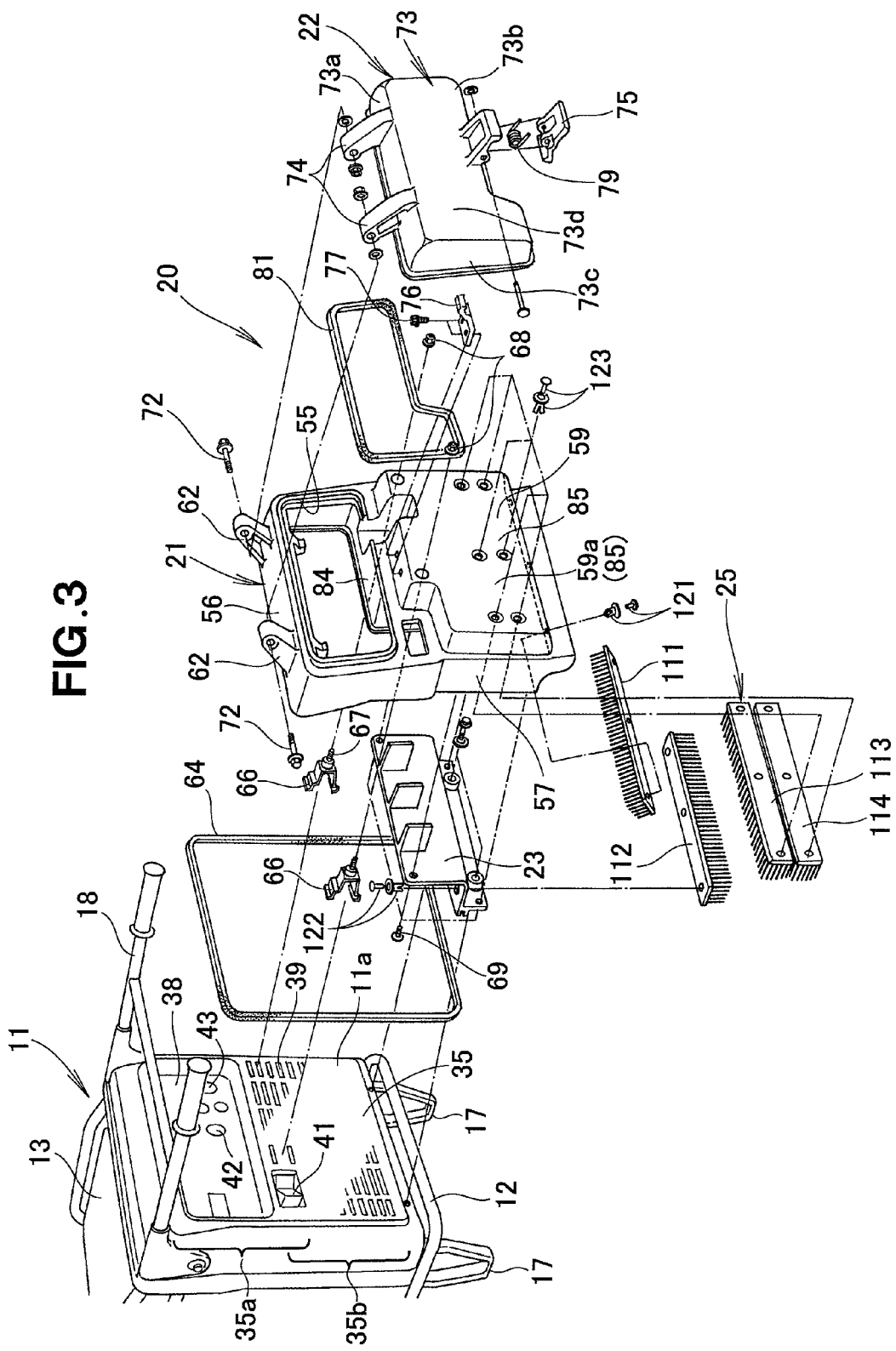
FIG. 3 is an exploded perspective view showing the engine-driven power generator apparatus of FIG. 1.

As shown in FIG. 3, the front cover 35 has an operation panel 38 provided on an upper portion 35a thereof, and an air intake louver (air intake port) 39 provided on a lower half portion 35b thereof. The operation panel 38 includes an engine operation switch 41, an AC terminal 42, a DC terminal 43, etc. provided thereon outside the case 13. The engine operation switch 41 is a switch operable to switch between activated and deactivated states of an engine 46. The AC terminal 42 and DC terminal 43 are terminals for outputting electric power generated by a power generator 47 (see FIG. 2).

As shown in FIG. 2, the power generator unit 15 includes: the engine 46 provided within the case 13; the power generator 47 provided on a front end portion of the engine 46; a recoil starter 48 provided on a front end portion of the power generator 47; a cooling fan 49 provided between the recoil starter 48 and the power generator 47; an air cleaner 51 provided on a left lower side of the engine 46; and an exhaust muffler 52 provided rearwardly of the engine 46.

The cooling fan 49 is provided adjacent to the front cover 35 of the case 13, and the air intake louver 39 (FIG. 3) is provided on the lower half portion 35b of the front cover 35. The air intake louver 39 opens in such a manner as to be capable of introducing cooling air from outside the case 13 into the interior 14 of the case 13. The air cleaner 51 has an air intake port 51a extending toward the air intake louver 39.

By the engine 46 being activated via the recoil starter 48, air is sucked from outside the case 13 into the air cleaner 51 through the air intake louver 39, and the sucked-in air is directed to a combustion chamber of the engine 46 via a carburetor 51. Meanwhile, exhaust gas is directed from a combustion chamber of the engine 46 to the exhaust muffler 52, and the exhaust gas having been directed to the exhaust muffler 52 is discharged from a rear opening 32a of the upper cover 32 to outside the case 13.

Further, in response to the activation of the engine 46, the cooling fan 49 is driven, so that air is sucked from outside the case 13 into the interior 14 of the case 13 through the air intake louver 39 (see also FIG. 3) and the engine 46 is cooled by the sucked-in air.

The power generator 47 generates electric power by being driven by the engine 46. With a conductive cable connected to the AC terminal 42 and DC terminal 43, the electric power generated by the power generator 47 can be partly taken out of the engine-driven power generator apparatus 10.

As shown in FIG. 3, the front cover 35 is covered with the waterproof unit 20 provided on the front section 11a of the power generator apparatus body 11. The waterproof unit 20 includes: a waterproof cover 21 covering the front cover 35 from the front; an opening/closing cover 22 provided in an opening section 55 of the waterproof cover 21; an air guide passage 24 (see FIG. 5) formed by a partition member 23 being provided within the waterproof cover 21; and a water separation unit (or means) 25 provided in the air guide passage 24.

Figure 4:
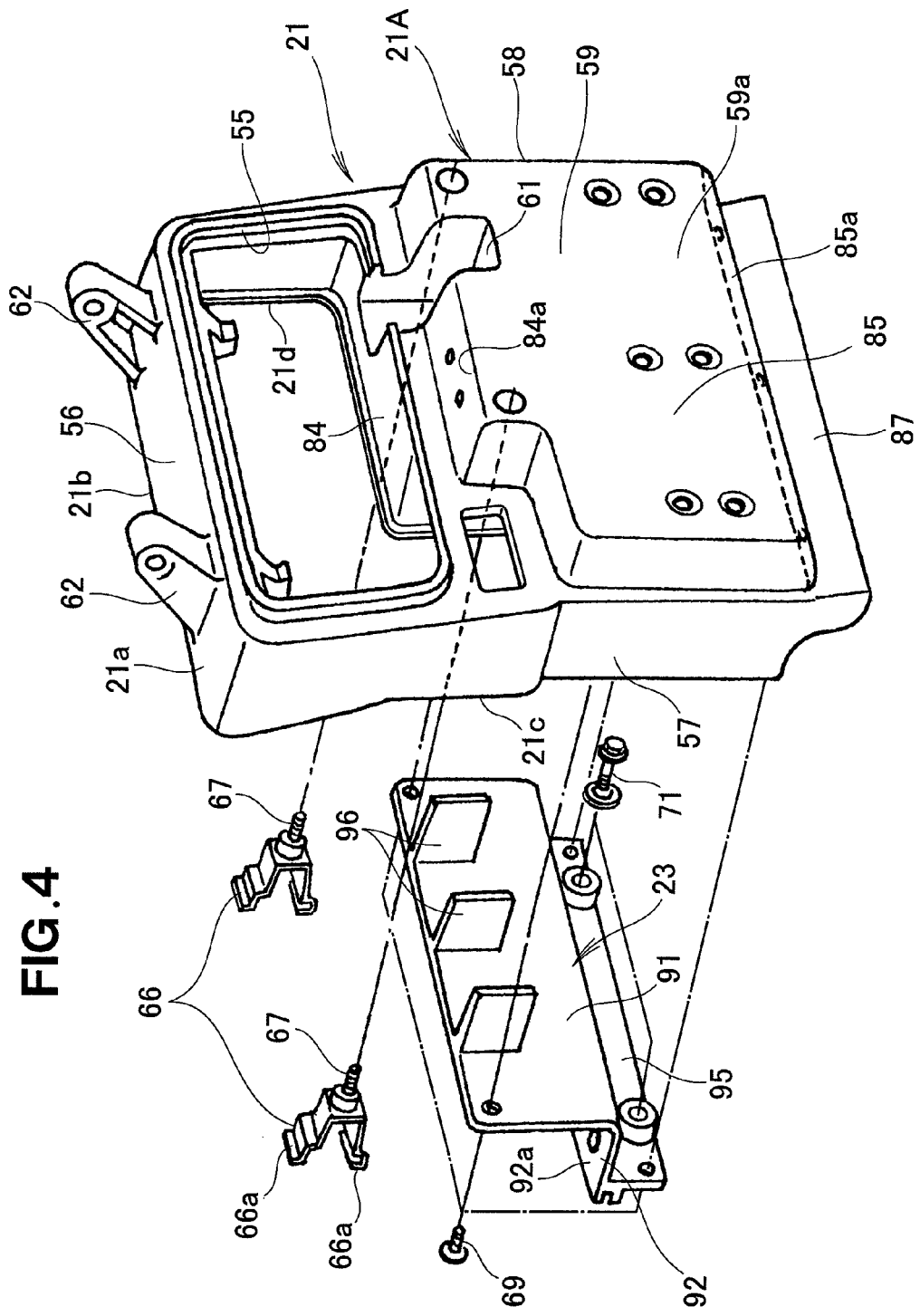
FIG. 4 is a perspective view showing a waterproof cover of FIG. 3.

As shown in FIGS. 3 and 4, the waterproof cover 21 is constructed to cover the operation panel 38 and the air intake louver 39 in a waterproof manner. The waterproof cover 21 has a generally rectangular box shape defined by an upper wall 56, left wall 57, right wall 58 and rear wall 59. The upper wall 56 of the waterproof cover 21 is a flat wall located over the operation panel 38 and has a pair of support brackets 62 provided thereon and spaced from each other by a predetermined distance. The rear wall 59 integrally connects to the respective rear ends of the upper wall 56, left wall 57 and right wall 58, and it has the opening section 55 formed in an upper half portion thereof.

A front end portion 21a of the waterproof cover 21 has a generally gate shape defined by an upper front end 21b, left front end 21c and right front end 21d. Further, a front end 92a of the partition member 23 (more specifically, a guide section 92 to be described later) connects to the lower end of the front end portion 21a of the waterproof cover 21. Thus, the front end portion 21a of the waterproof cover 21 has a generally rectangular shape defined by the upper front end 21b, left front end 21c, right front end 21d and front end 92a, and a first seal member 64 (see also FIG. 5) are provided on the upper front end 21b, left front end 21c, right front end 21d and front end 92a.

Figure 5:
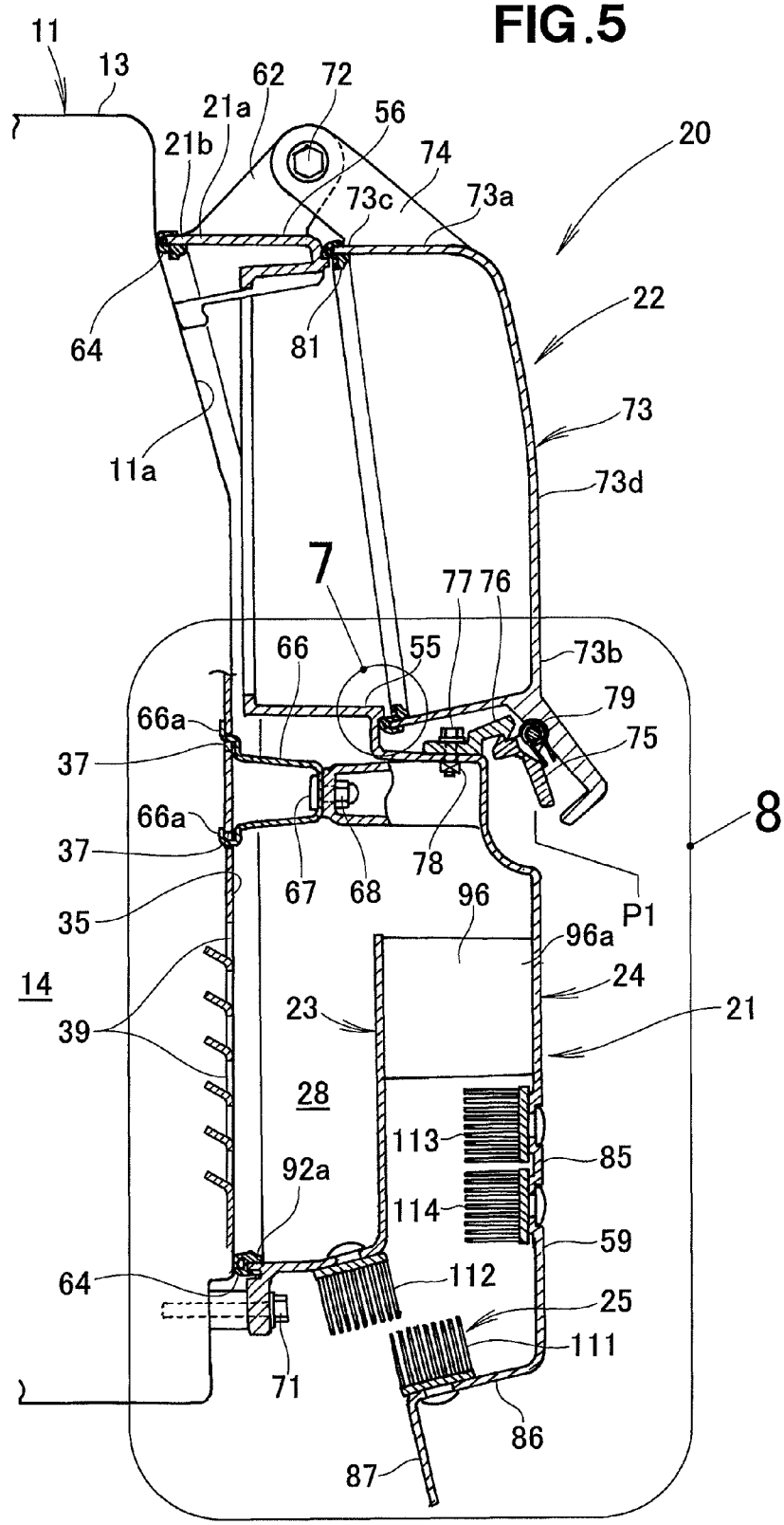
FIG. 5 is a sectional view showing a waterproof unit of FIG. 1.

The upper front end 21b, left front end 21c, right front end 21d and front end 92a are pressed, via the first seal member 64, against an outer peripheral portion of the front cover 35 as shown in FIG. 5. In this manner, a gap between the front cover 35 and the front end portion 21a and a gap between the front cover 35 and the front end 92a of the partition member 23 are sealed by the first seal member 64 in a waterproof manner.

As shown in FIGS. 3 and 5, a pair of mounting brackets 66 are mounted to the waterproof cover 21 from the rear of the cover 21 by means of bolts 67 and nuts 68. Base mounting portions 66a of each of the mounting brackets 66 are detachably engaged in engaging holes 37 (see also FIG. 8) of the front cover 35.

Further, the partition member 23 is mounted to the waterproof cover 21 from the rear of the cover 21 by means of bolts 69 and mounted to the front cover 35 by means of a pair of bolts 71. Also, the partition member 23 has a plurality of support portions 96 (more specifically, distal ends 96a of the support portions 96) abutted against a first guide wall 85 of the waterproof cover 21.

The above-mentioned bolts 67, nuts 68 and bolts 71 are fastener members capable of detachably mounting the waterproof cover 21 (waterproof 20) to the front cover 35; namely, the waterproof cover 21 is detachably mounted to the front cover 35 by means of the bolts 67, nuts 68 and bolts 71. Because the waterproof cover 21 is detachably mountable to the front cover 35 as above, the waterproof unit 20 is applicable to existing engine-driven power generator apparatus. In this way, it is possible to expand the application of the waterproof unit 20. Further, it is possible to readily select specifications of an engine-driven power generator apparatus equipped with a waterproof function and an engine-driven power generator apparatus not equipped with a waterproof function depending on their intended applications.

Further, the opening section 55 is formed in the upper half portion of the rear wall 59 of the waterproof cover 21 in confronting relation to the operation panel 38. Furthermore, the opening/closing cover 22 is pivotably mounted to the pair of support brackets 62 by means of a pair of bolts 72.

The opening/closing cover 22 includes a cover body 73 having a generally rectangular box shape, a pair of mounting portions 74 provided on an upper portion 73a of the cover body 73, and a locking claw 75 provided on a lower portion 73b of the cover body 73. The mounting portions 74 are pivotably connected to corresponding ones of the support brackets 62 by means of the pair of bolts 72.

Figure 6:
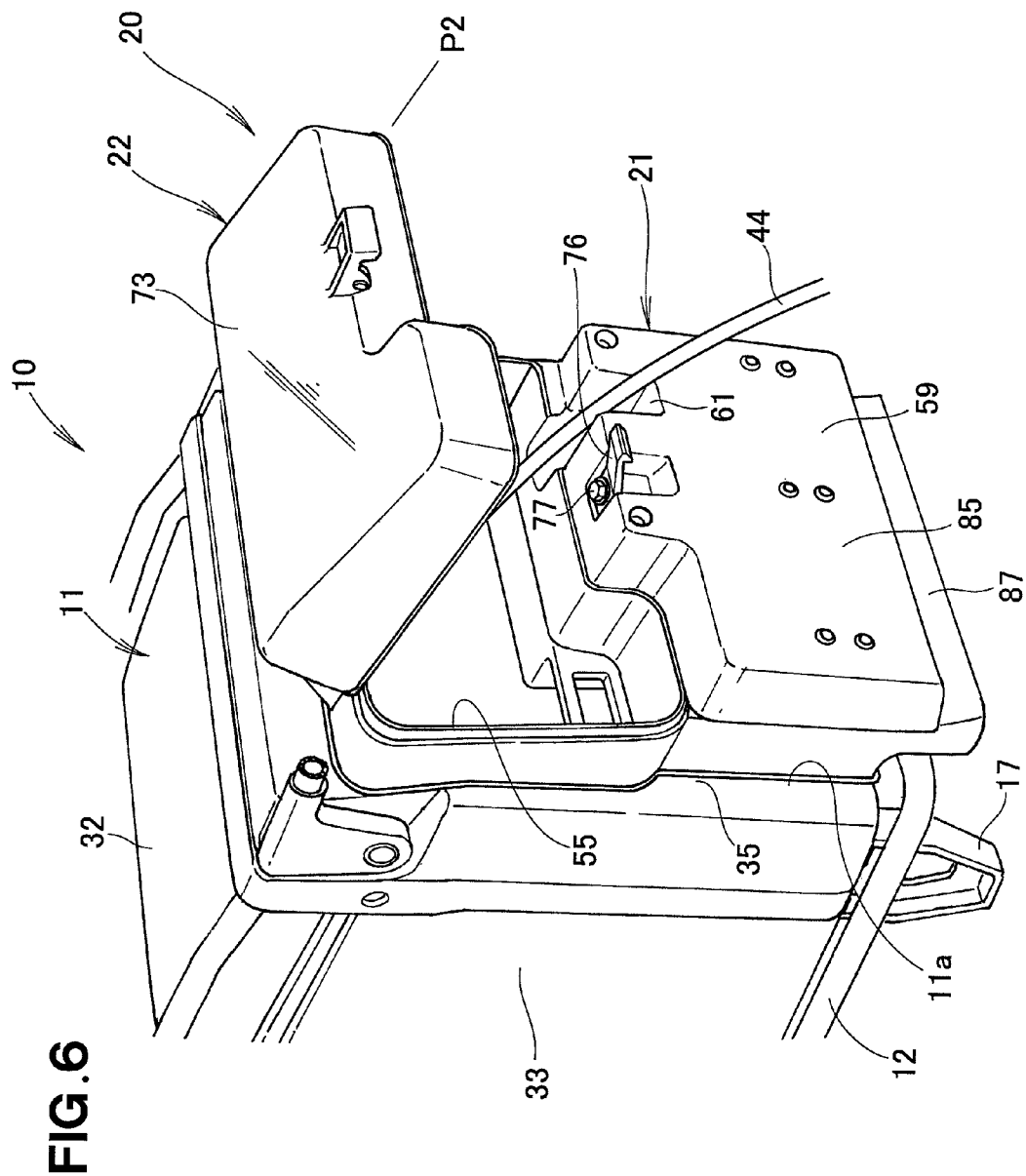
FIG. 6 is a perspective view showing an opening/closing cover of FIG. 1 in an opened position.

Thus, the opening/closing cover 22 is pivotable about the pair of bolts 72 between a closed position P1 (FIG. 5) and an opened position P2 (FIG. 6). The closed position P1 is where the opening section 55 is closed with the opening/closing cover 22. The locking claw 75 is engaged with an engaging claw 76 when the opening/closing cover 22 in the closed position P1, so that the opening/closing cover 22 is held in the closed position P1. The engaging claw 76 is secured to a portion of the rear cover 36 below the opening section 55 by means of a bolt 77 and a nut 78.

As shown in FIG. 6, the above-mentioned opened position P2 is where the opening section 55 is opened by the cover 22 being pivotally moved away from the opening section 55. More specifically, the opening/closing cover 22 is movable from the closed position P1 to the opened position P2 by the locking claw 75 being disengaged from the engaging claw 76 against biasing force of a spring member 76.

Figure 7:
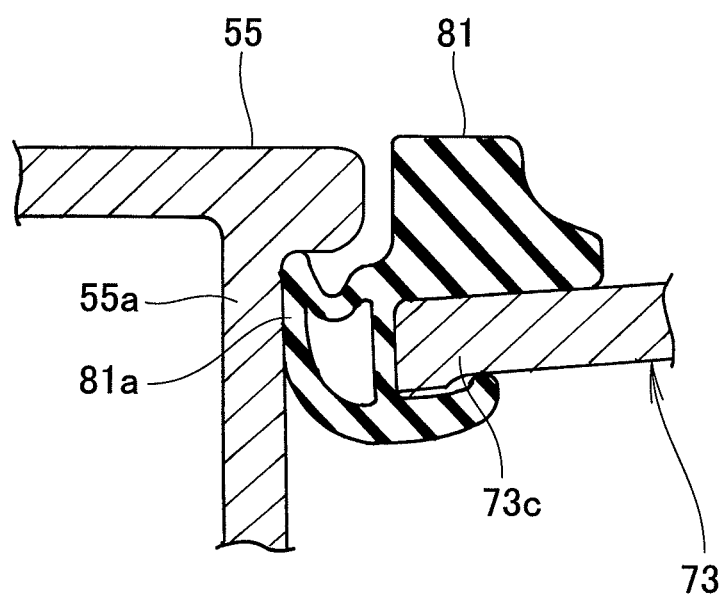
FIG. 7 is an enlarged view of a section enclosed at 7 in FIG. 5.

As further shown in FIGS. 3 and 5, the cover body 73 has a generally box shape bulging rearwardly, and a front end portion 73c of the cover body 73 is pressed against an outer peripheral edge portion 55a (see FIG. 7) of the opening section 55 via a second seal member 81. In this way, a waterproof property can be secured between the outer peripheral edge portion 55a of the opening section 55 and the front end portion 73c of the cover body 73. The first seal member 64 shown in FIG. 3 and the second seal member 81 are formed in a similar sectional shape.

As seen from FIGS. 3 and 5, the instant embodiment can secure a waterproof property of the operation panel 38 and a waterproof property of the air intake louver 39 by providing the waterproof unit 20 on the front section 11a of the power generator apparatus body 11 and closing the opening/closing cover 22. In this way, the waterproof unit 20 can protect the operation panel 38 from water, such as rain water, and prevent water, such as rain water, from entering the interior 14 of the case 13. Further, by opening the opening/closing cover 22, the instant embodiment allows a human operator to readily operate the engine operation switch 41 etc. of the operation panel 38 and thereby can enhance operability of the engine operation switch 41 etc.

In addition, the opening section 55 of the waterproof cover 21 has a cable accommodating recessed portion 61 provided therein adjacent to a lower right corner of the opening section 55, as shown in FIG. 4. By the cable 44 being accommodated in the cable accommodating recessed portion 61, the opening/closing cover 22 can be closed without interfering with the cable 44. Thus, the opening/closing cover 22 can maintain the opening section 55 in a waterproof state with the cable 44, connected to the AC terminal 42 and DC terminal 43 (see FIG. 3), partly taken out from the opening section 55 through the cable accommodating recessed portion 61.

Figure 8:
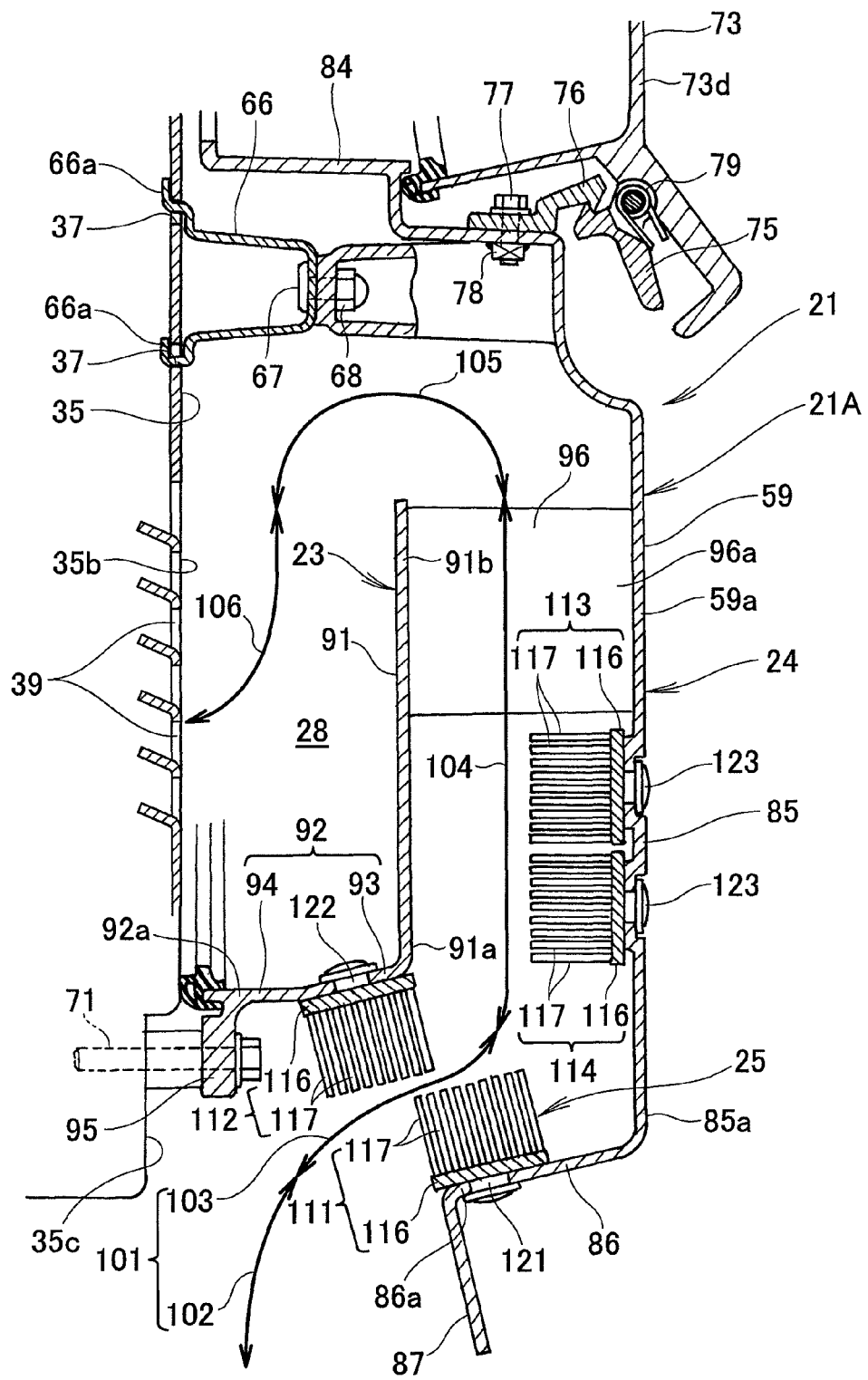
FIG. 8 is an enlarged view of a section enclosed at 8 in FIG. 5.

As shown in FIGS. 4 and 8, a lower half section 21A of the waterproof cover 21 bulges rearwardly so that a lower half portion 59a of the rear wall 59 of the waterproof cover 21 is located generally in flush with a rear wall 73d of the cover body 73. The lower half section 21A includes: a middle partition wall 84 provided between the operation panel 38 and the air intake louver 39; the first guide wall 85 extending from the rear end 84a of the middle partition wall 84; a guiding slanting portion (i.e., first guiding slanting portion) 86 extending from the lower end 85a of the first guide wall 85; and an introducing portion 87 extending from the lower end 86a of the first guiding slanting portion 86.

The middle partition wall 84 is provided generally horizontally between the operation panel 38 and the air intake louver 39 so as to partition between the operation panel 38 and the air intake louver 39. The first guide wall 85 is a portion formed by a vertical flat region of the lower half portion 59a of the rear wall 59. The first guide wall 85 extends vertically downward from the rear end 84a of the middle partition wall 84 and thus is disposed rearwardly of the air intake louver 39 (lower half portion 35b of the front cover 35) in parallel to the lower half portion 35b of the front cover 35 and at a predetermined distance from the lower half portion 35b.

The first guiding slanting portion 86 extends in a downward slope from the lower end 85a of the first guide wall 85 toward a lower end portion 35c of the front cover 35. The introducing portion 87 is bent from the lower end 36a of the first guiding slanting portion 86 downwardly in a direction away from the lower end portion 35c of the front cover 35.

The partition member 23 is provided in the interior 28 of the lower half section 21A of the waterproof cover 21. The partition member 23 includes: a second guide wall 91 disposed generally vertically; the guide portion 92 provided at the lower end 91a of the second guide wall 91; a mounting base portion 95 provided at the front end 92a of the guide portion 92; and the plurality of support portions 96a provided on an upper portion 91b of the second guide wall 91.

The mounting base portion 95 is mounted to the lower end portion 35c of the front cover 35 by means of the pair of bolts 71, and the plurality of support portions 96 are abutted at their distal ends 96a against the first guide wall 85 of the waterproof cover 21. Further, the partition member 23 is mounted at its four corner portions to the waterproof cover 21 by means of the bolts 69. In the aforementioned manner, the partition member 23 is provided in the interior 28 of the lower half section 21A of the waterproof cover 21.

The second guide wall 91 is disposed generally halfway between the first guide wall 85 and the air intake louver 39 (lower half portion 35b of the front cover 35) in parallel relation to the lower half portion 35b and the first guide wall 85. The guide section 92 is disposed upwardly and forwardly of the first guiding slanting portion 86 at a predetermined distance from the first guiding slanting portion 86. The guide section 92 includes a guiding slanting portion (i.e., second guiding slanting portion) 93 extending from the lower end 91a of the second guide wall 91, and a horizontal portion 94 extending from the front end of the second guiding slanting portion 93.

The second guiding slanting portion 93 extends in a downward slope from the lower end 91a of the second guide wall 91 toward the lower end portion 35c of the front cover 35 in such a manner that the second guiding slanting portion 93 lies in parallel to the first guiding slanting portion 86. The horizontal portion 94 extends horizontally from the front end of the second guiding slanting portion 93 to the lower end portion 35c of the front cover 35. The plurality of support portions 96, each oriented vertically, project horizontally from the upper portion 91b of the second guide wall 91 to the first guide wall 85.

With the partition member 23 provided in the interior 28 of the lower half section 21A as set forth above, the air guide passage 24 is defined in the interior 28 of the lower half section 21A. The air guide passage 24 includes: an air introducing section 101 formed downwardly in a lower portion of the lower half section 21A; an upward air guiding path 104 communicating with a downstream side of the air introducing section 101; an air bending guiding path 105 communicating with a downstream side of the upward air guiding path 104; and a downward air guiding path 106 communicating with a downstream side of the air bending guiding path 105.

The air guide passage 24 is formed in a labyrinth shape with the air introducing section 101, upward air guiding path 104, air bending guiding path 105 and downward air guiding path 106. The air introducing section 101 is in communication with the outside of the lower half section 21A and the downward air guiding path 106 is in communication with the air intake louver 39, so that the outside of the lower half section 21A is in communication with the air guide passage 24 via the air guide passage 24.

The air introducing section 101 includes an introducing opening 102 provided in a lower end portion of the lower half section 21A, and an introducing slanting portion 103 provided downstream of the introducing opening 102. The introducing opening 102 is defined by the lower end portion 35c of the front cover 35 and the introducing portion 87 of the lower half section 21A and opens downwardly from the lower end of the lower half section 21A. With the introducing opening 102 opening downwardly, the instant embodiment can prevent water, such as rain water, from easily entering the introducing opening 102. The introducing slanting portion 103 is defined with the first guiding slanting portion 86, guide section 92 and left and right side walls 57 and 58 of the waterproof cover 21 and extends in an upward slope from the introducing opening 102 toward the introducing slanting portion 104.

The introducing slanting portion 104 is defined with the first guide wall 85, second guide wall 91 and left and right side walls 57 and 58 of the waterproof cover 21 and extends vertically upward from the introducing slanting portion 103 toward the air bending guiding path 105. The first guide wall 85 is a wall provided vertically above the introducing slanting portion 103 for upwardly guiding air introduced through the introducing slanting portion 103.

The air bending guiding path 105 is defined with an upper portion of the lower half section 21A, middle partition wall 84, front cover 35 and left and right side walls 57 and 58 of the waterproof cover 21 and extends in a generally curved shape from the upward air guiding path 104 toward the downward air guiding path 106. The downward air guiding path 106 is defined with the front cover 35, second guide wall 91 and left and right side walls 57 and 58 and extends from the air bending guiding path 105 downwardly toward the air intake louver 39. The downward air guiding path 106 has a downstream portion communicating with the air intake louver 39.

Figure 9:
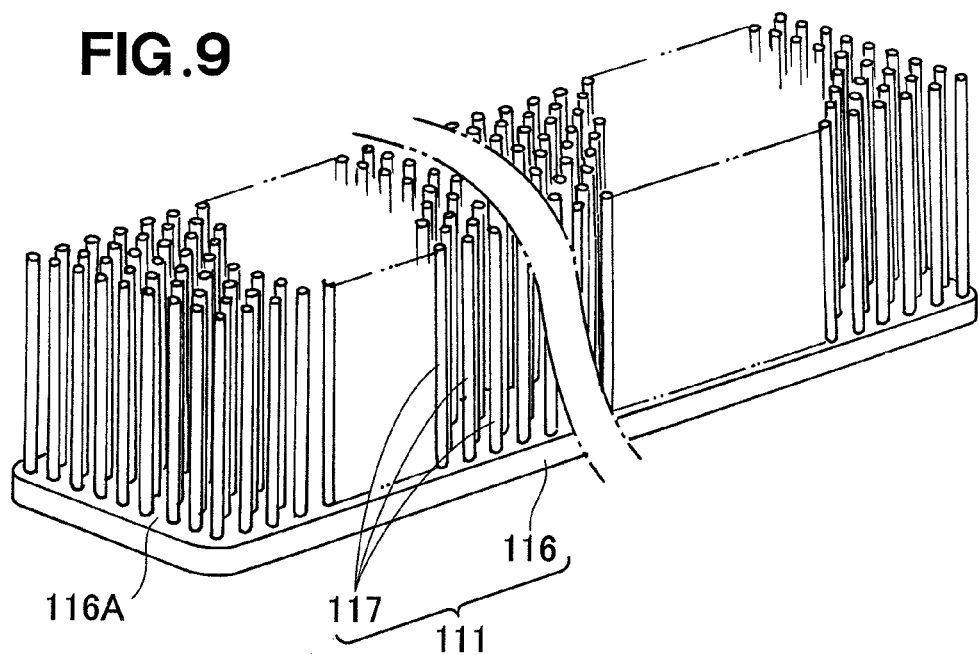
FIG. 9 is a perspective view showing a first water separation section of FIG. 8.

As shown in FIGS. 8 and 9, the water separation unit 25 is provided in the interior of the air guide passage 24. The water separation unit 25 includes first and second water separation sections 111 and 112 provided in the introducing slanting portion 103, and third and fourth water separation sections 113 and 114 provided in the upward air guiding path 104. The first, second, third and fourth water separation sections 111, 112, 113 and 114 are generally similar in construction. Each of the first, second, third and fourth water separation sections 111, 112, 113 and 114 includes a base 116 and a plurality of pins 117. Namely, the water separation section 111 is formed generally in a shape of a brush or a flower-arranging pin holder with the plurality of pins 117 projecting from the base 116.

Figure 10:
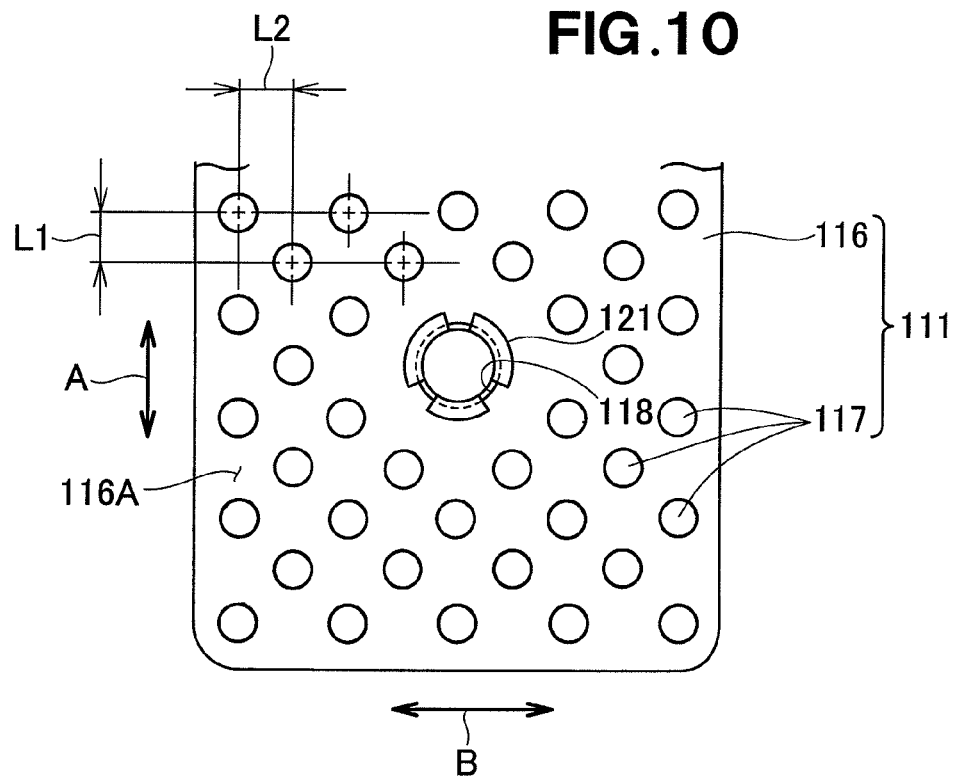
FIG. 10 is a perspective view showing the first water separation section of FIG. 8.

As shown in FIGS. 8 and 10, the first water separation section 111 is secured at the base 116 to the first guiding slanting portion 86 by means of a plurality of clips 121 (see also FIG. 3), and the plurality of pins 117 project from the base 116 to a substantially central region (i.e., to near the center of a flow path cross section) of the introducing slanting portion 103.

The base 116 of the first water separation section 111 has a generally rectangular shape as viewed in plan and has a mounting hole 118 formed therein. The base 116 is mounted to the first guiding slanting portion 86 by means of the clips 121 (see also FIG. 3) inserted in a mounting hole of the first guiding slanting portion 86 and the mounting hole 118 of the base 116. The base 116 slantingly extends along the first guiding slanting portion 86.

The plurality of pins 117 project from the surface 116a of the base 116 to a substantial central region of the introducing slanting portion 103 in such a direction as to generally orthogonally intersect flows of air along the introducing slanting portion 103. Each of the pins 117 has a generally circular cross-sectional shape and tapers from its base portion 117a to its distal end 117b. The plurality of pins 117 are provided in a rectangular arrangement of staggered rows at a pitch L1 in a length direction thereof (i.e., in a direction of arrow A) and with gaps at a pitch L2 in a width direction thereof (i.e., in a direction of arrow B).

As further shown in FIG. 8, the second water separation section 112 is secured at the base 116 to the guiding slanting portion 93 of the guide section 92 by means of a plurality of clips 122, and the plurality of pins 117 project from the surface of the base 116 to a substantial central region (i.e., to near the center of the flow path cross section) of the introducing slanting portion 103 in an opposite direction to the plurality of pins 117 of the first water separation section 111. The base 116 of the second water separation section 112 slantingly extends along the second guiding slanting portion 93.

In the aforementioned manner, the first and second water separation sections 111 and 112 are provided on the introducing slanting portion 103, and the plurality of pins 117 of the first and second water separation sections 111 and 112 are provided to cover a substantially entire flow path cross-section of the introducing slanting portion 103.

When air is introduced from outside the lower half section 21A into the air introducing section 101, the outside air is first directed to the second guiding slanting portion 93 and then directed from the second guiding slanting portion 93 toward the first guiding slanting portion 86. Thus, the first water separation section 111 is provided in the second guiding slanting portion 93, and the second water separation section 112 is provided in the first guiding slanting portion 86.

Thus, most of the air introduced into the air introducing section 101, i.e. air flowing into the air introducing section 101 at high speed, can be directed to the first water separation section 111 and second water separation section 112. In this way, the air introduced into the air introducing section 101 can be efficiently directed to the pins 117 of the first and second water separation sections 111 and 112.

The third water separation section 113 is secured to a vertically middle region of the first guide wall 85 of the upward air guiding path 104 by means of a plurality of clops 123 in such a manner that the pins 117 project horizontally. The fourth water separation section 114 is secured to the first guide wall 85 beneath the third water separation section 113 and generally in vertical alignment with the third water separation section 113 by means of a plurality of clops 123.

Thus, the plurality of pins 117 project horizontally from the base 116 of each of the third and fourth water separation sections 113 and 114 to a substantial middle region (i.e., to near the center of a flow path cross section) of the upward air guiding path 104, in such a manner as to generally orthogonally intersect flows of air along the upward air guiding path 104. Such pins 117 of the third and fourth water separation sections 113 and 114 are provided along a substantially half of the inner surface of the first guide wall 85 in the flow path cross section of the upward air guiding path 104.

The upward air guiding path 104 is provided in such a manner that the first guide wall 85 is confronting to an exit 103a of the introducing slanting portion 103. Thus, most of the air directed from the introducing slanting portion 103 to the upward air guiding path 104, i.e. air flowing from the introducing slanting portion 103 to the upward air guiding path 104 at high speed, can be guided to the first guide wall 85 and directed upwardly along the first guide wall 85.

Thus, the third and fourth water separation sections 113 and 114 are provided on the first guide wall 85, so that the air directed to the upward air guiding path 104 can be efficiently directed to the pins 117 of the third and fourth water separation sections 113 and 114.

Figure 11A:
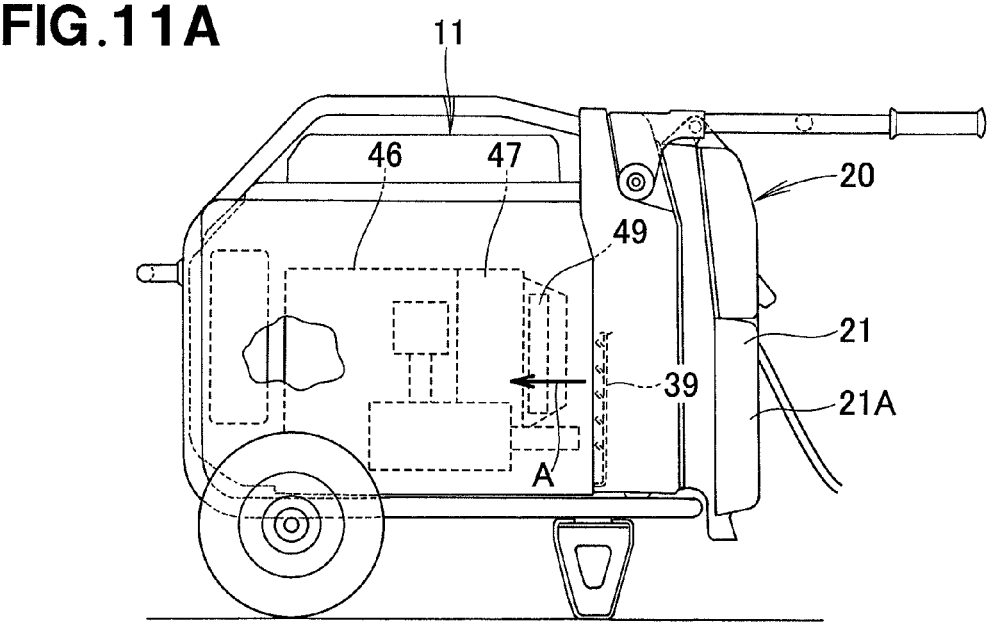
FIGS. 11A and 11B illustrate an example manner in which air is introduced into an air guide passage of the engine-driven power generator apparatus according to the present invention.

Now, with primary reference to FIGS. 11 and 12, a description will be given about an example manner in which the engine-driven power generator apparatus 10 is operated. First, as shown in FIG. 11A, the engine 46 is activated to drive the power generator 47, so that electric power is generated by the power generator 47. Also, by the activation of the engine 46, the cooling fan 49 is rotated, so that sucking force acts on the air intake louver 39 as indicated by arrow A.

Figure 11B:
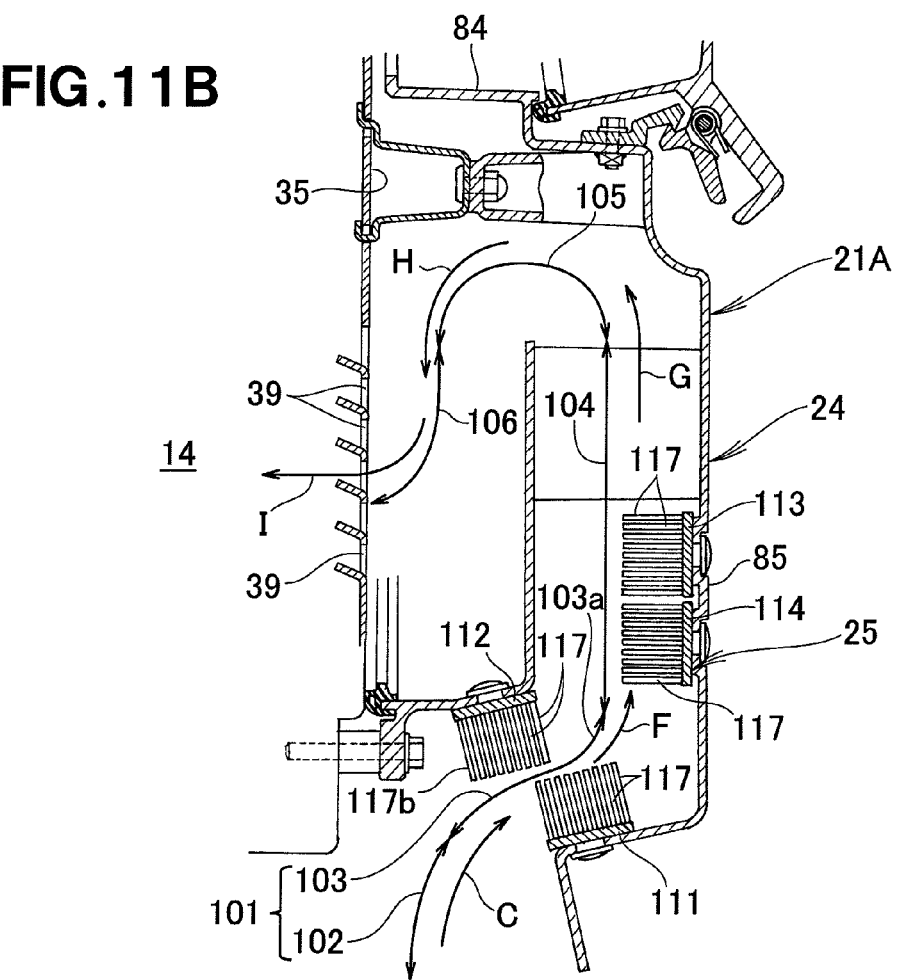

By the sucking force acting on the air intake louver 39, air is directed from outside of the lower half section 21A of the waterproof cover 21 to the introducing slanting portion 103 by way of the introducing opening 102 of the air guide passage 24 as indicated by arrow C in FIG. 11B. The pins 117 of the first and second water separation sections 111 and 112 are provided to cover a substantially entire flow path cross section of the introducing slanting portion 103, so that the air directed to the introducing slanting portion 103 passes between the pins 117. It is conceivable that rainwater splattered back from the ground surface is contained as water, such as water droplets and mist, in the air directed from outside the lower half section 21A of the waterproof cover 21 to the introducing slanting portion 103.

As the air directed to the introducing slanting portion 103 passes among the pins 117, the air hits the pins 17. By the air hitting the pins 117, the water contained in the air would stay as water droplets 125 on the pins 117. The water droplets 125 having stayed on the pins 17 then descend along the pins 117 to the base 116 as indicated by arrow D in FIG. 12B.

The base 116 of the first water separation section 111 extends in an upward slope along the first guiding slanting portion 86. Thus, the water droplets 125 having moved to the introducing opening 102 moves along the base 116 toward the introducing opening 102 as indicated by arrow E in FIG. 12B and then is discharged out of the lower half section 21A of the waterproof cover 21 by way of the introducing opening 102.

If the base 116 is formed of a material having a superior volatile property, the water droplets 125 having arrived at the base 116 might be directed in a flowing direction of the air. Therefore, it is preferable that the base 116 be formed of a material having a superior hydrophilic property, in which case the water droplets 125 having arrived at the base 116 can be prevented from being directed in the flowing direction of the air.

Figure 12A:
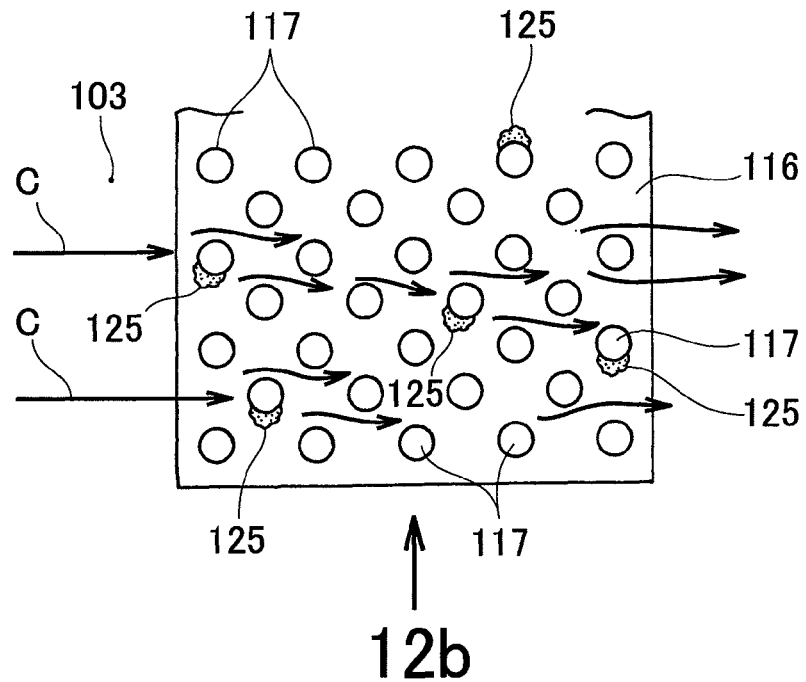
FIG. 12A is a top plan view illustrating an example manner in which water is separated from air by the first water separation section.
Figure 12B:
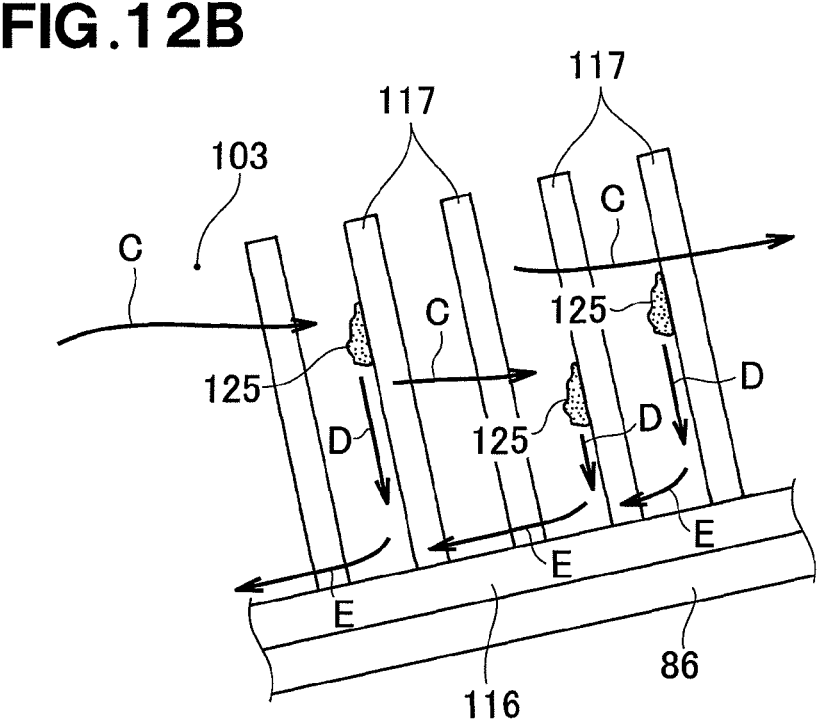
FIG. 12B is a view taken in the direction of arrow 12b of FIG. 12A.

Further, as the air directed to the introducing slanting portion 103 passes through the second water separation section 112, the air hits the pins 117 of the second water separation section 112. By the air hitting the pins 117 of the second water separation section 112, the water (water droplets and mist) contained in the air would stay as water droplets 125 on the pins 117, as seen in FIG. 12A.

The pins 117 of the second water separation section 112 project downward from the base 116. Thus, the water droplets 125 having stayed on the pins 117 move to the distal (lower) ends 117b of the pins 117, from which the water droplets 125 are discharged out of the lower half section 21A of the waterproof cover 21 by way of the introducing opening 102.

As noted above, most of the air introduced into the air introducing section 101, i.e. air flowing into the air introducing section 101 at high speed, can be directed to the first water separation section 111 and second water separation section 112. In this way, the air introduced into the air introducing section 101 can be efficiently directed to the pins 117 of the first and second water separation sections 111 and 112, and thus, the water can be efficiently separated from the air.

Namely, the water can be separated from the air by means of the first and second water separation sections 111 and 112, so that the air having passed through the introducing slanting portion 103 can be directed to the upward air guiding path 104 as indicated by arrow F in FIG. 11B. Most of the air directed from the introducing slanting portion 103 to the upward air guiding path 104 is guided upwardly along the first guide wall 85 of the waterproof cover 21.

The air directed to the upward air guiding path 104 in the aforementioned manner can be efficiently directed to the pins 117 of the third and fourth water separation sections 113 and 114 provided on the first guide wall 85. The air passes among the pins 117 of the third and fourth water separation sections 113 and 114, during which time the air hits the pins 117 of the third and fourth water separation sections 113 and 114. Thus, the water contained in the air would stay as water droplets 125 on the pins 117 (see FIG. 12A), and the water droplets 125 having stayed on the pins 17 fall downward from the pins 117 and then is discharged out of the lower half section 21A by way of the introducing slanting portion 103 and introducing opening 102.

By the provision of the water separation unit 25 (first to fourth water separation sections 111 to 114) in the air guide passage 24, the water directed via the introducing opening 102 to the air guide passage 24 can be separated as water droplets 125 (see FIG. 12A) from the air directed via the introducing opening 102 to the air guide passage 24. Further, the thus-separated water droplets 125 can be discharged out of the air guide passage 24.

After the water is separated from the air by means of the pins 117 of the third and fourth water separation sections 113 and 114, the air, having the water separated therefrom, is directed to the air bending guiding path 105 as indicated by arrow G. Then, the air directed to the air bending guiding path 105 is directed to the downward air guiding path 106 as indicated by arrow H in FIG. 11B. Then, the air directed to the downward air guiding path 106 is directed through the air intake louver 39 to the interior 14 of the case 13. In this way, the instant embodiment can prevent water, such as rain water, from entering the interior 14 of the case 13 and thereby secure an enhanced waterproof property.

In addition to the above, the introducing opening 102 opens downwardly from the lower end of the lower half section 21A of the waterproof cover 21. With the introducing opening 102 opening downwardly like this, the instant embodiment can prevent water, such as rain water, from easily entering the air guide passage 24. In this way, the instant embodiment can even more effectively prevent water, such as rain water, from entering the interior 14 of the case 13, thereby achieving an even further enhanced waterproof property.

It should be noted that the engine-driven power generator apparatus of the present invention is not limited to the above-described preferred embodiment and may be modified as necessary. For example, whereas the preferred embodiment has been described above in relation to the case where the pins 117 are provided on the base 116 of each of the water separation sections 111 to 114 in a rectangular arrangement of staggered rows, the present invention is not so limited, and the pins 117 may be arranged in a matrix or any other suitable arrangement. Further, whereas the preferred embodiment has been described above in relation to the case where the pin 117 is formed in a circular cross-sectional shape, the present invention is not so limited, and the pin 117 may be formed in any other cross-sectional shape.

Furthermore, whereas the preferred embodiment has been described above in relation to the case where the pin 117 is formed to taper from the base portion 117a to the distal end 117b, the present invention is not so limited, and the pin 117 may be formed to have an uniform outer diameter substantially throughout its length from the base portion 117a to the distal end 117b.

Furthermore, whereas the preferred embodiment has been described above in relation to the case where the base 116 is formed of a material having a superior hydrophilic property, the present invention is not so limited.

Furthermore, whereas the preferred embodiment has been described above in relation to the case where the waterproof unit 20 is provided on the front cover 35 of the case 13, the present invention is not so limited, and the waterproof unit 20 may be provided on another cover of the case 13.

Furthermore, whereas the preferred embodiment has been described above in relation to the case where the bolts 67, nuts 68 and bolts 71 are used as fastener members for detachably mounting the waterproof unit 20 to the front cover 35, the present invention is not so limited, and any other suitable fastener members, such as clips, may be used.

The engine-driven power generator apparatus 10, case 13, waterproof cover 21, opening/closing cover 22, air guide passage 24, water separation unit 25, front cover 35, operation panel 38, air intake louver 39, engine 46, power generator 47, opening section 55, first guide wall 85, air introducing section 101, etc. are not limited to the shapes and constructions shown and described above and may be modified as appropriate.

The basic principles of the present invention are well suited for application to engine-driven power generator apparatus which include, within a case, an engine and a power generator drivable with the engine, and in which an operation panel and an air intake port are provided on a wall portion of the case and air can be introduced into the case through the air intake port.

What is claimed is:

1. An engine-driven power generator apparatus which includes, within a case, an engine and a power generator drivable with the engine, and in which an operation panel is provided on a wall portion of the case and an air intake port for introducing air into the case is provided within the case, said engine-driven power generator apparatus comprising:
    a waterproof cover covering the operation panel and the air intake port;
    an air guide passage of a labyrinth shape provided within the waterproof cover and communicating an outside of the waterproof cover with the air intake port; and
    a brush-shaped water separation means provided in the air guide passage and having a plurality of pins projecting in a direction intersecting flows of air in the air guide passage.

2. The engine-driven power generator apparatus according to claim 1, wherein the air guide passage includes an air introducing section provided in a lower end portion of the waterproof cover and opening downwardly, and a guide wall provided vertically above the air introducing section for upwardly guiding air introduced via the air introducing section, and
    wherein, in the air guide passage, the water separation means is not only provided to cover a substantially entire flow path cross section of the air introducing section but also provided on an inner surface of the guide wall.

3. The engine-driven power generator apparatus according to claim 1, wherein the waterproof cover has an opening section formed in confronting relation to the operation panel, and the waterproof cover includes an opening/closing cover for opening and closing the opening section.

4. The engine-driven power generator apparatus according to claim 1, wherein the opening section of the waterproof cover has a cable-accommodating recessed portion provided therein to accommodate a conductive cable for outputting electric power generated by the power generator.

5. The engine-driven power generator apparatus according to claim 1, wherein the waterproof cover is detachably mounted to the case by means of a fastener member.

* * * * *